(Model.)

H. C. HARTLEY.
BELT REPLACING DEVICE.

No. 257,323. Patented May 2, 1882.

Witnesses.
Jas. E. Hutchinson
Henry C. Hazard

Inventor.
Henry C. Hartley, by
Geo. S. Prindle, his Atty.

N. PETERS. Photo-Lithographer. Washington, D. C.

UNITED STATES PATENT OFFICE.

HENRY C. HARTLEY, OF SPRINGFIELD, OHIO.

BELT-REPLACING DEVICE.

SPECIFICATION forming part of Letters Patent No. 257,323, dated May 2, 1882.

Application filed August 18, 1881. (Model.)

*To all whom it may concern:*

Be it known that I, HENRY C. HARTLEY, of Springfield, in the county of Clarke, and in the State of Ohio, have invented certain new and useful Improvements in Belt-Replacing Devices; and I do hereby declare that the following is a full, clear, and exact description thereof, reference being had to the accompanying drawings, making a part of this specification, in which—

Figure 1:
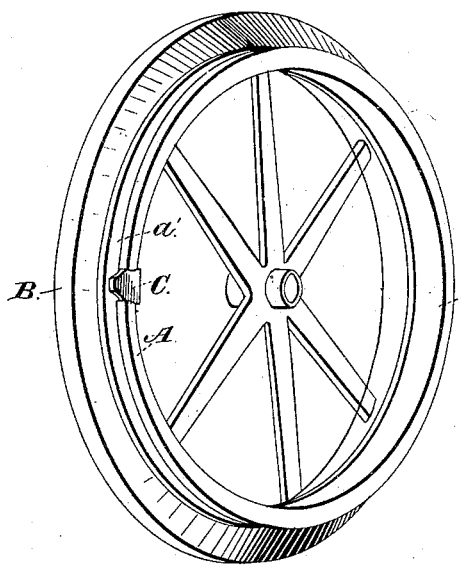
Figure 2:
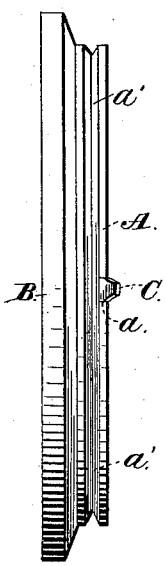
Figure 3:
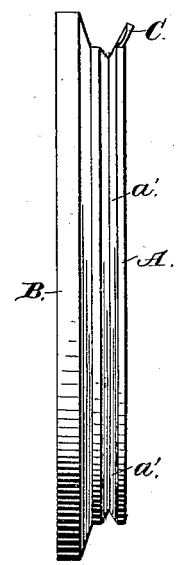
Figure 4:
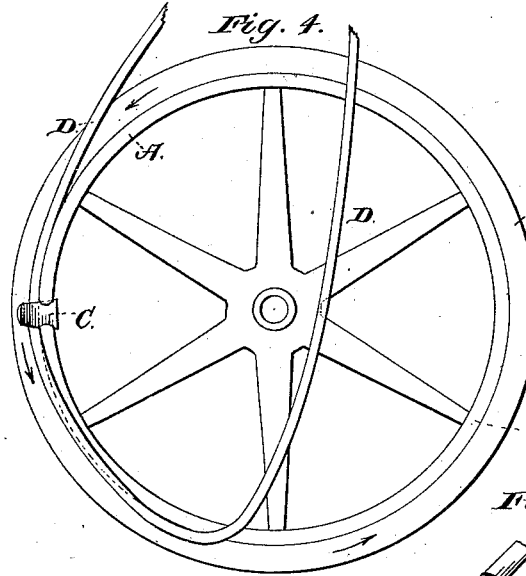
Figure 5:
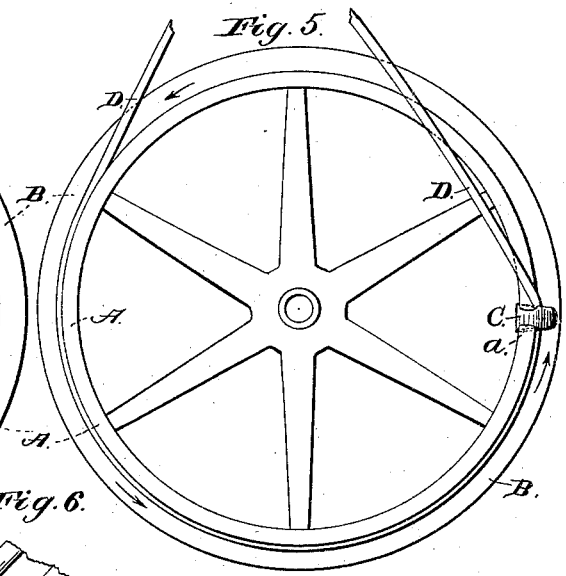
Figure 6:
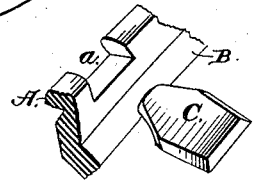
Figure 7:
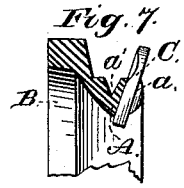

Figure 1 is a perspective view of a belt-pulley provided with my improvement. Figs. 2 and 3 are front elevations of the same. Figs. 4 and 5 are side elevations of said pulley, and show respectively the positions of parts when the belt is first started and when nearly in position upon the pulley. Fig. 6 is a perspective view of the portion of said pulley fitted to receive the lug, and of said lug separated from each other; and Fig. 7 is a section of the same upon a line parallel with the periphery.

Letters of like name and kind refer to like parts in each of the figures.

The design of my invention is to enable a belt to be easily and quickly placed in position upon the driving-pulley of a sewing-machine; and to this end it consists, as a means for replacing a belt upon a pulley, and in combination therewith, in a lug secured within one edge, at the periphery of the same, its inner plain face having a radial and laterally-outward inclination, and its edges being beveled or rounded, substantially as and for the purpose hereinafter specified.

In the annexed drawings, A represents the grooved driving-pulley of a sewing-machine, which is secured upon the face, and forms part of the balance-wheel B, in the usual manner.

Within the outer edge of the pulley A is provided a radial groove, $a$, which has a depth from the face of said pulley inward of about one-eighth of an inch, and a width circumferentially of about three-fourths of an inch, and has its sides beveled so as to form a dovetail of said recess.

Fitted into the recess $a$ is a lug, C, which corresponds therewith in transverse size and shape, and has sufficient taper to cause it, when driven in from below, to closely fill said recess and to be firmly held in place. The out end of the lug C projects about one-half inch beyond the periphery of the pulley A, and has the general shape of an inverted letter V, with the point rounded. The inner face of said lug, at its edges, is beveled or rounded, as shown, so as to present a surface for engagement by a belt that shall not cut, abrade, or otherwise injure the latter.

In placing a belt, D, upon the pulley A, from the front, said belt is hooked over the lug C, as shown in Fig. 4, and said pulley rotated in the direction indicated by the arrows, when said belt will be prevented from slipping out of the groove $a'$ of said pulley and will be forced to run into the same, as seen in Fig. 5.

In consequence of the oppositely-beveled face of the lug C and its outward inclination, the belt D may be run upon the pulley A from either direction, and when once in place does not again come into contact with said lug, while by the rounding of the outer end of the latter no injury to the clothing of the operator can result from its use.

While the means described for attaching the lug C are preferably employed, said lug may form part of the pulley A, or may be attached in any other manner, if desired.

Having thus fully set forth the nature and merits of my invention, what I claim as new is—

As a means for replacing a belt upon a pulley, and in combination therewith, a lug secured within one edge, at the periphery of the same, its inner plain face having a radial and laterally-outward inclination, and its edges being beveled or rounded, substantially as and for the purpose specified.

In testimony that I claim the foregoing I have hereunto set my hand this 16th day of August, 1881.

HENRY C. HARTLEY.

Witnesses:
A. H. GILLETT,
JAMES P. GOODWIN.